(12) United States Patent
Latzina

(10) Patent No.: US 9,053,293 B2
(45) Date of Patent: Jun. 9, 2015

(54) PERSONAL AUTHENTICATIONS ON COMPUTING DEVICES

(75) Inventor: Markus Latzina, Wiesenbach (DE)

(73) Assignee: SAP SE, Walldorf, DE (US)

(*) Notice: Subject to any disclaimer, the term of this patent is extended or adjusted under 35 U.S.C. 154(b) by 490 days.

(21) Appl. No.: 13/471,969

(22) Filed: May 15, 2012

(65) Prior Publication Data

US 2013/0312087 A1   Nov. 21, 2013

(51) Int. Cl.
G06F 21/00 (2013.01)
G06F 21/31 (2013.01)
G06F 17/27 (2006.01)

(52) U.S. Cl.
CPC ............ *G06F 21/00* (2013.01); *G06F 21/31* (2013.01); *G06F 17/277* (2013.01); *G06F 2221/0711* (2013.01)

(58) Field of Classification Search
CPC   G06F 21/31; G06F 17/277; G06F 2221/0711
USPC ................. 726/19, 17, 20; 713/185
See application file for complete search history.

(56) References Cited

U.S. PATENT DOCUMENTS

2006/0294599 A1* 12/2006 Sim et al. ............ 726/34
2007/0250920 A1* 10/2007 Lindsay ............... 726/7

* cited by examiner

*Primary Examiner* — Ellen Tran
(74) *Attorney, Agent, or Firm* — Brake Hughes Bellermann LLP

(57) ABSTRACT

A computer device receives a personal authentication statement from a user seeking to access concealed computer objects or applications on the computer device. A parser syntactically parses the personal authentication statement to extract a user-authentication token and a computer objects-authentication token. The computer objects-authentication token can identify one or more concealed computer objects on the computer device. The computer device reveals the one or more concealed computer objects to the user upon authentication of the user and verification that the authenticated user is authorized to access the concealed computer objects.

20 Claims, 4 Drawing Sheets

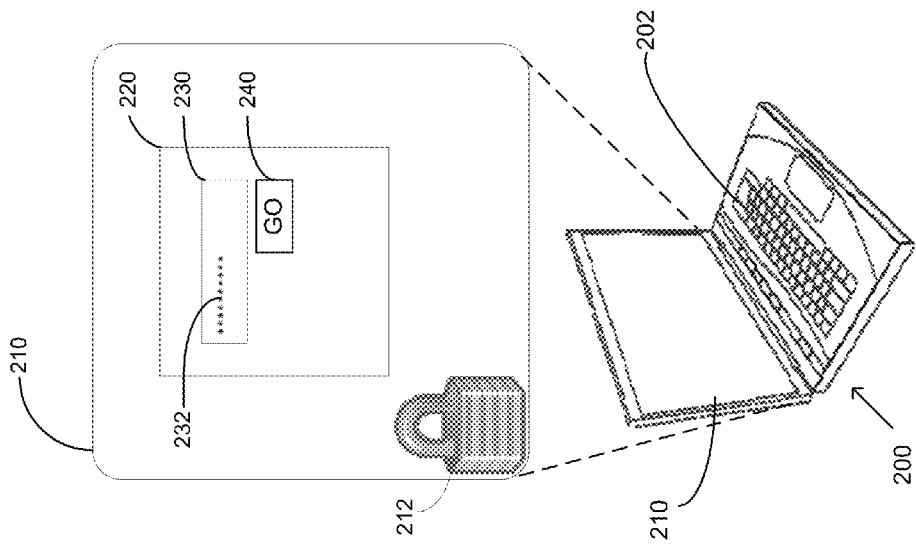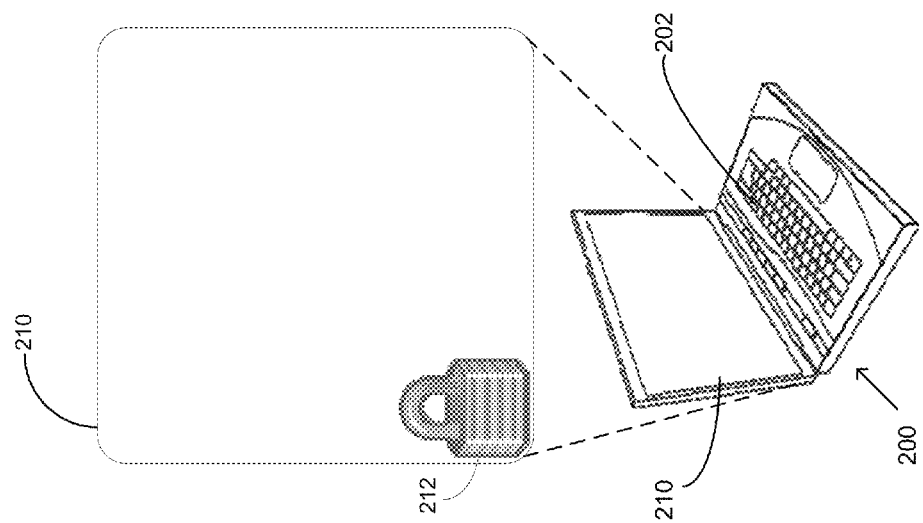

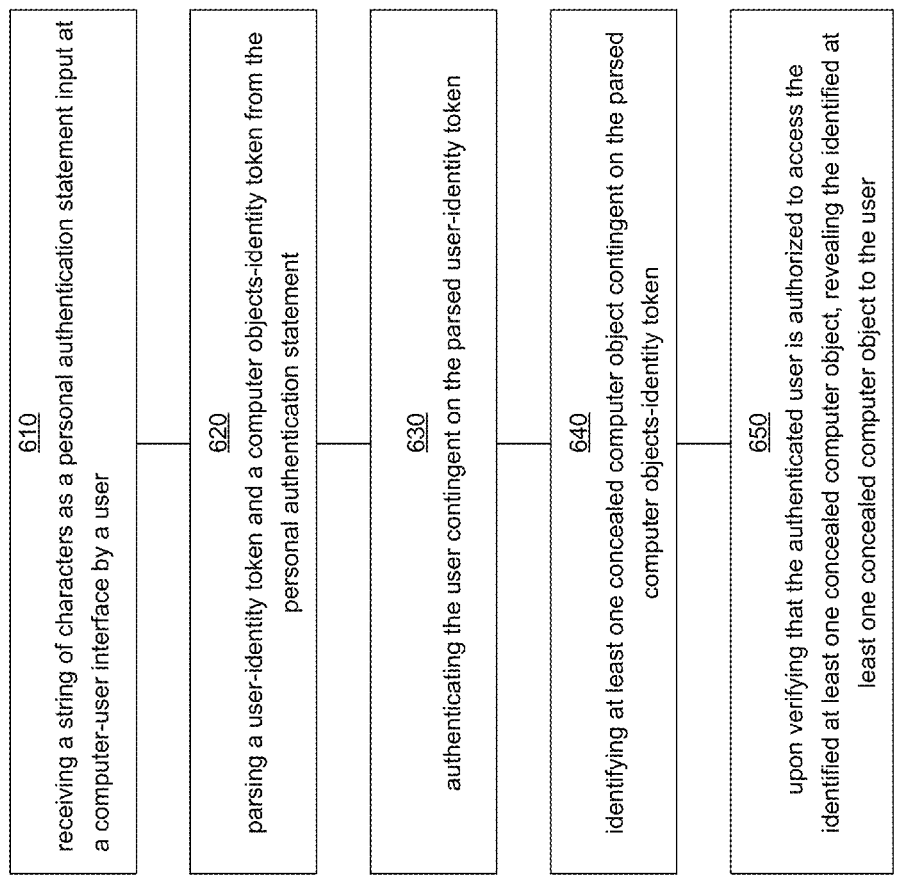

PERSONAL AUTHENTICATIONS ON COMPUTING DEVICES

BACKGROUND

For security or other reasons (e.g., privacy), a computer system may limit user access to data on the system, or otherwise control user actions or operations on the system. Users may be authenticated and authorized to access only certain data, or may be granted privileges to take only certain actions on the computer systems.

In general, security and authorization mechanisms, which control access to operations or data in the computer systems, can be both direct and indirect. A computing system may conduct direct security checks of user credentials or authorization profiles (e.g., authentication identification codes (IDs) and passwords) at an attachment interface or facility (e.g., a log-in screen, at a firewall etc.)) before users can gain access to a resource (e.g., individual files or data objects, computer devices, network connections, computer programs, applications, and functionality provided by computer applications, etc.) of the computing system.

A computer system may use object-oriented technology and may make processes and data available in the form of objects (e.g., file and folder types). The computer system may deploy an access control list (ACL)-based security model to govern authorization processes to grant users access to or privileges to manipulate (e.g., read, write, copy, delete, etc.) objects in the computer system. An ACL, with respect to a computer file system, is a list of permissions or authorizations attached to an object. An ACL specifies which users or system processes are authorized to access the objects and what operations are allowed on given objects. Each "authority" entry for an object in a typical ACL specifies a subject and an operation.

A computer system can require a user wanting to access a specific resource or object (e.g., a software application or program) on the computer system to submit credentials for user authentication or identification. The computer system can implement "device-related" authentication procedures for general access (e.g., logging on) to a computer device and further "application-specific" authentication procedures for access to a particular application. For both device-related and application-specific authentication procedures user credentials can be based on something only the user knows, something only the user has, something only the user is, or, where the user is. The credentials are evaluated by the computer system to confirm that the user is entitled to work with the application (i.e. can read or modify data which can be accessed through the application).

The user identification and authentication processes of the computer system requiring users to submit credentials to log on to a computer system, a device or a particular application are a means for enforcing institutional security and confidentiality policies. The user identification and authentication processes of the computer system can also mitigate users' privacy concerns by restricting access to user-related information on the computer system. However, common authentication procedures are not foolproof as impostors or defrauders can, for example, submit stolen, hacked or guessed user credentials (e.g., user id or passwords, etc.) or otherwise bypass the authentication procedures to improperly gain access to computer resources and information related to other users.

A user may want to keep information related to his or her usage of a computer device private. For example, a user may have specific applications privately deployed and available on the computer device for personal use. The user may want to conceal knowledge from others that the specific applications are deployed, for example, if the computer device falls in wrong hands or in circumstances where the computer device is shared with other legitimate users.

Consideration is now being given to user privacy concerns and techniques for safeguarding information related to usage of a computer device.

SUMMARY

A personal authorization statement-based authorization framework is provided for authorizing individual user access to concealed applications or objects on a computer device.

Under this authorization framework, user credentials for object access authorization may include information identifying both the user and the computer object that the user is seeking to access. The user credentials may be presented in a single personal authorization statement, which includes a user-identifier token and one or more computer objects-identifier tokens. The authorization framework allows one or more computer objects that may be generally concealed to be revealed, upon request, to an authenticated user who is authorized to access the one or more computer objects.

A user may invoke or retrieve a specific concealed application by submitting a personal authentication statement, which names or otherwise identifies the specific application (e.g., by a code) and includes other user credentials (e.g., user id), for validation or authentication. If the personal authentication statement is not validated or authenticated (i.e. the user is not authorized), the specific application remains concealed and information regarding its presence is still kept private.

Attempts at unauthorized access to concealed applications (e.g., by impostors or defrauders) may be avoided by the keeping knowledge of the existence of the concealed applications private. The personal authorization statement-based authorization framework allows knowledge of the existence of the concealed applications to be kept private.

In one general aspect, a computer device has concealed computer objects. The computer device includes a computer-user interface configured to receive a string of characters representing a personal authentication statement from a user who is seeking to access a concealed computer object. The computer device includes a parser to syntactically parse the personal authentication statement to extract a user-authentication token and a computer objects-authentication token. The computer objects-authentication token can identify the concealed computer object, which the user is seeking to access. Authentication processes in the computer device can authenticate the user and the identity of the concealed computer object. The computer device is configured to reveal the concealed computer object upon authentication of the user and verification that the authenticated user is authorized to access the concealed computer object.

In another general aspect, a method, which may be implemented in a microprocessor-based computer device, involves receiving a string of characters as a personal authentication statement input by a user at a computer-user interface. The method involves syntactically parsing a user-authentication token and a computer objects-authentication token from the personal authentication statement. The method involves authenticating or identifying the user and at least one concealed computer object based on the parsed tokens. The method next involves verifying that the authenticated user is authorized to access the identified at least one concealed computer object, and upon such verification revealing the identified at least one concealed computer object to the user.

In one general aspect, a non-transitory computer readable medium includes instructions capable of being executed on a microprocessor. The instructions when executed allow a computer device to process a string of characters as a personal authentication statement input by a user at a computer-user interface. The instructions when executed further allow the computer device to parse a user-authentication token and a computer objects-authentication token from the personal authentication statement input by the user. The computer device can reveal a concealed computer object identified by the computer objects-authentication token, upon authentication of the user and verification that the authenticated user is authorized to access the concealed computer object.

The details of one or more implementations are set forth in the accompanying drawings and the description below. Further features of the disclosed subject matter, its nature and various advantages will be more apparent from the accompanying drawings the following detailed description, and the claims.

BRIEF DESCRIPTION OF THE DRAWINGS

FIGS. 2-5 are schematic illustrations of an example interaction of a user with a computer-user interface of a laptop computer, which uses a personal authorization statement-based authorization framework to govern access to concealed objects, in accordance with the principles of the disclosure herein.

FIG. 6 shows an example method for revealing and granting a user access to concealed computer objects in a computer system, in accordance with principles of the disclosure herein.

DETAILED DESCRIPTION

Figure 1:
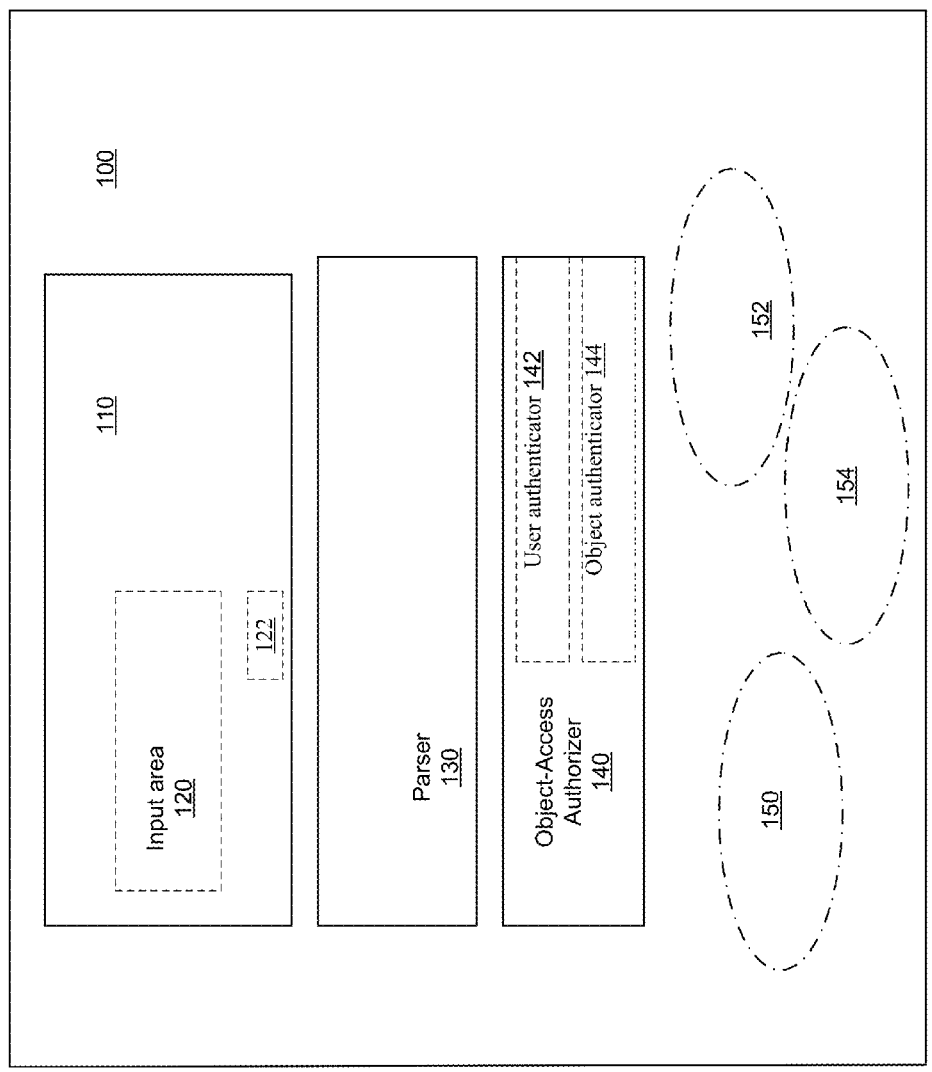
FIG. 1 is a schematic block diagram illustrating a computing system having an authorization framework based on personal authorization statements, in accordance with the principles of the disclosure herein.

For convenience in description herein, computer resources, processes and data (e.g., programs, applications or solutions, files, folders, data structures, or other resources, etc.) may be referred to herein as computer "objects." Further, while a laptop computer may be shown as a convenient working example of a computing device in the description herein, it will be understood that the principles of the disclosure are not limited to a laptop computer, but are applicable to any of a variety of computing devices and computing platforms (e.g., work stations, desktops, laptops, tablets, smart phones, dumb terminals, etc., and standalone, linked or networked computing platforms, cloud computing platforms, etc.) that are available to users.

In a typical computer security scenario when a user wants to operate a computing system or access a program or application on the computing system, the user may first have to be authenticated and authorized to operate the computing system or access a program or application. The computing system may deploy authentication services to verify user identity and use authorization services or processes to determine what level of privileges a particular authenticated user should be granted for access to secured resources or objects controlled by the computing system. The authentication services may ask the user to provide "user-identity" credentials (e.g., a user id or logon id, a password, pass phrase, or personal identification number (PIN), a challenge response (i.e. an answer to a question), etc.). The "user-identity" credentials may confirm or authenticate user identity for grant of "device-related" access to the computing system. Further, the authorization services may use access control lists or other authorization information repositories in the computing system to determine what level of privileges (e.g., read, write, delete, copy, etc.) the authenticated user should have to access secured resources or objects controlled by the computing system. Optionally or additionally, the authentication services may be application or object-specific and ask the authenticated user to present additional "authorization-identity" credentials (e.g., a user id, a password, pass phrase, or personal identification number (PIN), a challenge response) that provide information verification of user identity or authenticity for accessing a particular or specific object on the computing system.

In the computer systems, which are the subject of the present disclosure, computer objects may be concealed from general view. The objects may be completely concealed—they may not displayed on screens or listed in any file or system directories (including hidden file directories) which are accessible or can be viewed by a user. The computer objects may be concealed to decrease security risks by disguising true purposes or capabilities of the computer systems. Concealing the computer objects may, for example, prevent an inadvertent user or a defrauder who gains improper access to a sensitive computer system from learning a true use or capability of the sensitive computer system. Only genuine users may know the concealed computer objects or the true use of the sensitive computer system.

Under the authorization framework of the present disclosure, authorization-identity credentials of a genuine user seeking access to a particular concealed object may be formatted and presented in a single personal authorization statement. User-authentication identifiers and computer object-authentication identifiers may be combined in the personal authorization statement. The authorization framework allows one or more computer objects that may be generally concealed to be revealed, upon request, to an authenticated user who is authorized to access the one or more computer objects.

FIG. 1 is a schematic block diagram showing an example computer system 100 having an authorization framework based on a user's personal authorization statement, in accordance with the principles of the disclosure herein. In computer system 100, one or more computer objects (e.g. objects 150-154) may be generally concealed. The one or more computer objects (150-154) may be secured and concealed from general view (i.e. they may not displayed on screens or listed in file or system directories, etc.) in computer system 100. Only a user who is verifiably authorized to access a computer object may be allowed to unconceal or reveal a computer object (e.g., object 150) upon presentation of proper authorization-identity credentials.

The authorization framework deployed in computer system 100 may allow one or more of the concealed computer objects to be selectively revealed upon request to an authenticated user who is authorized to access the one or more computer objects. A user may request access to the concealed objects by submitting a personal authorization statement for authentication/authorization. The user' personal authorization statement may combine user- and computer object-authentication identifiers or tokens.

Computer system 100 includes a user-computer interface 110 with an input field 120 configured to receive a user's personal authorization statement. Computer system 100 further includes a parser 130, and an object-access authorizer 140 to process the user's personal authorization statement received via user-computer interface 110. Object-access authorizer 140 may include user and object authenticators (e.g., user authenticator 142 and object authenticator 144).

Under the authorization framework of the present disclosure, authorization-identity credentials of a user may be presented in a single personal authorization statement. User-authentication words or tokens, and computer object-authentication words or tokens may be combined in the personal authorization statement. A computer objects-authentication word or token in the personal authorization statement may, for example, include object or application identifiers and, optionally, associated user identifiers.

An example personal authorization statement may include a user-authentication word or token followed by a computer objects-authentication word or token. A syntax of an example personal authorization statement may be as follows:

<user password>+<application name>.

A syntax of another example personal authorization statement may be as follows:

<user password>+<code for retrieving a set of applications>.

A syntax of yet another example personal authorization statement may be as follows:

<user password>+<application name, user id>, or
<user password>+<code for retrieving a set of applications, user id>.

In general, a syntax of an example personal authorization statement may include one or more user-authentication words or tokens and one or more computer objects-authentication words or tokens. The words or tokens may be in any order. One or more of the user-authentication and the computer objects-authentication words or tokens may have fixed lengths. The personal authorization statement may be represented by a string concatenation of characters of the user-authentication and computer objects-authentication words therein. The personal authorization statement may avoid obvious or easily discernible delimiters between the user-authentication and computer objects-authentication words. Alternatively, the string of characters in a personal authorization statement may include special symbols, characters or font formats (e.g., upper case, lower case, bold, or italics) that may serve to delimit the user-authentication and computer objects-authentication words from each other.

It will be noted that the user authentication information (e.g., user id, user password, etc.) included in a personal authorization statement for grant of access to concealed objects to a user may be the same or different than information in user credentials that are used to authenticate the user for access (e.g., log on) to computer system 100 itself. For example, the user may have one user id and password for logging on the computer system and another user id or password in the personal authorization statement for access to the concealed objects on the computer system.

Genuine users who are authorized to access the one or more computer objects may have individually personalized authorization statements for accessing the one or more concealed computer objects on computer system 100. Computer system 100 may include facilities and tools that allow users to individually personalize their personal authorization statements. The facilities or tools may allow the users to personalize their personal authorization statements object-by-object or by sets of objects.

With renewed reference to FIG. 1, a genuine user of computer system 100 may gain device-related access (e.g., log on) to computer system 100 conventionally, for example, by submitting authentication credentials (e.g., user id, password, etc.) for validation by the authentication services deployed in computer system 100. The genuine user may further submit his or her individual personal authorization statement (e.g., by typing in text) in input area 120 of computer-user interface 110 to initiate access to a concealed computer object. In a version of computer system 100 to further disguise the presence of concealed computer objects, input area 120 that is configured to receive a user's personal authorization statement may be displayed only in limited circumstances. Computer system 100 may, for example, optionally include a switch (e.g., button 122) or other activation means that can be activated to display input area 120 on computer-user interface 110. The activation means for activating a display of input area 120 may be user-customizable and may, for example, include means responsive to a button- or switch-activated, a touch-activated, a gesture-activated or a voice-activated signal from the user. A genuine user wanting to initiate access to a concealed computer object may first use the activation means to generate a display of input area 120 to receive his or her personal authorization statement for authorization processing.

In computer system 100, parser 130 may be configured to, as part of a process for authorizing user access to concealed objects, perform syntactic analysis including lexical analysis of the text or string of characters representing the personal authorization statement placed in input area 120. Parser 130 may syntactically parse a user-identifier token and one or more objects-identifier tokens that may be included in the text of the personal authorization statement placed in input area 120. Parser 130 may present the parsed tokens to object-access authorizer 140 for authentication and authorization processing.

In object-access authorizer 140, user-entity authenticator 142 may confirm or authenticate user identity based on the parsed user-identifier token, and objects-entity authenticator 144 may confirm or authenticate the identities of one or more concealed computer objects based on the parsed objects-identifier tokens. Object-access authorizer 140 may further avail of access control lists or other authorization records in computer system 100 to run processes for authorizing or denying the authenticated user access to the one or more identified concealed objects. Object-access authorizer 140 or other processes in computer system 100 may, in the case of grant of authorization, suitably reveal the one or more identified concealed objects to the user. Object-access authorizer 140 may, for example, display access to the object to the user on user-computer interface 110 as an applications window.

FIGS. 2-5 illustrate an example interaction of a user with a computer-user interface (e.g., display 210) of a computer (e.g., laptop computer 200), which uses a personal authorization statement-based authorization framework to govern access to concealed objects. Laptop computer 200 may include authorization process modules (e.g., parser 130, an object-access authorizer 140, etc.) to process a user's personal authorization statement to reveal or grant access to the concealed objects. The authorization processes in laptop computer 200 may be the same or similar to the authorization processes in computer system 100 described above with reference to FIG. 1.

A genuine user may log on laptop computer 200 using genuine authentication credentials. In contrast, a defrauder or impostor may gain access to "logged-on" laptop computer 200, for example, when it is inadvertently left unattended in a logged-on state by the genuine user, or by using hacked or stolen user credentials to log on laptop computer 200. In any case, display 210 of laptop 200 may carry no visual indicators or information on the presence of the concealed computer objects (e.g., objects 250, 252, 254, FIG. 5). Only the genuine user may know of their presence and may be able to reveal or access the concealed computer objects only upon submitting an object or application-specific personal authorization statement for authentication.

Display 210 of laptop computer 200 may include an icon or button (e.g., button 212) which the genuine user can activate to initiate a process to reveal or access the concealed computer objects. For convenience in description and visual clarity, button 212 is represented by a "lock" icon in FIG. 2. However, it will be understood that laptop 200 may be configured so that button 212 is inconspicuous, disguised or hidden among other display items (not shown). Only the genuine user may know of the presence or purpose of button 212. Laptop 200 may alternatively provide other inconspicuous means (e.g., means responsive to a touch-activated, a gesture-activated or a voice-activated signal to initiate the process to access the concealed computer objects.

In response to user initiation of the process to access the concealed computer objects (e.g., by clicking on button 212), laptop computer 200 may present an authentication dialogue window 220 on display 210 to receive a text 232 of the user's personal authentication statement. Authentication dialogue window 220 may, for example, show a text input field 230 in which the user may enter text 232 of the user's personal authentication statement via keyboard 202 (FIG. 3) For privacy and security, laptop computer 200 may be configured to mask characters of text 232 as it is being entered in text input field 230 by the user. Authentication dialogue window 220 may also, for example, show a send button (e.g., GO button 240) for the user to submit input text 232 to the authentication and authorization processes in laptop computer 200. Alternatively, laptop computer 200 may be configured so that the user can submit text 232 for processing by striking a particular key or a key sequence (e.g., Shift-Esc-Enter) on keyboard 202. For increased security, only authorized users may be informed of which particular key or a key sequence is required to submit text 232.

FIG. 3 shows example authentication dialogue window 220 with a single text input field 230 to receive text 232 of the user's personal authentication statement. In general, for increased security and to further confuse unauthorized users, a version of laptop 200 may be configured to display several text input fields (not shown) including dummy input fields along with text input field 230. A position of text input field 230 amongst the dummy text input fields may be randomized. Secret visual codes may be used to mark or label text input field 230 amongst the dummy text input fields. Only authorized users may be informed of the code used to mark the position of text input field 230 amongst the dummy text input fields.

Figure 4:
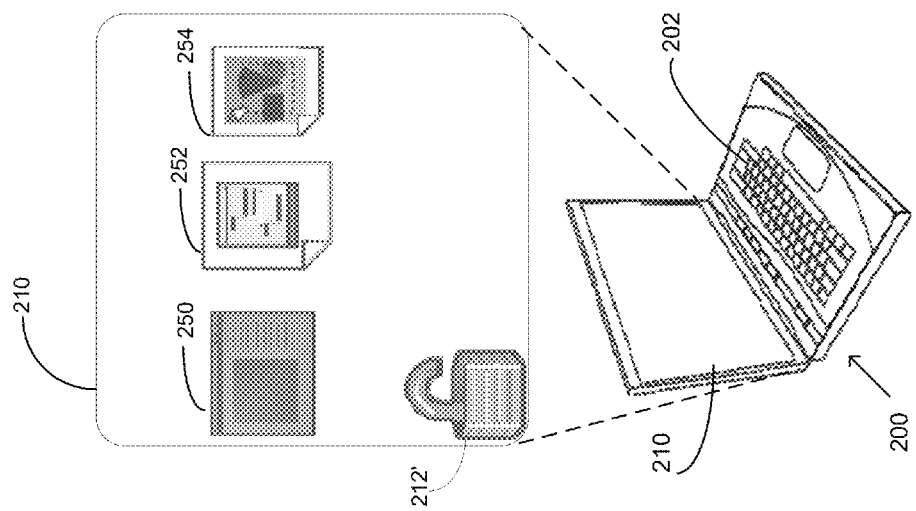
Figure 5:
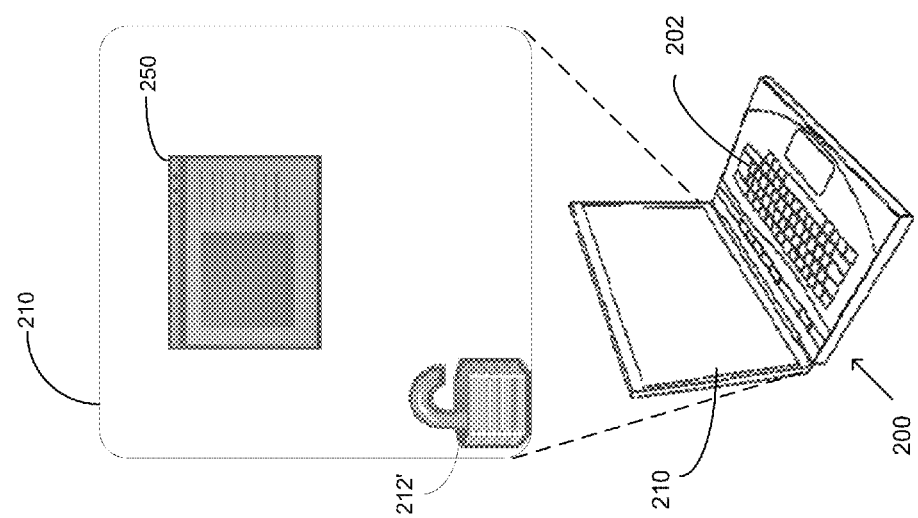

Personal authorization statement text 232, which is submitted by the user, may be processed by authorization process modules (e.g., parser 130, an object-access authorizer 140) in laptop 200 to reveal or grant access to the concealed objects. Particular concealed objects, which may be identified by the computer objects-authentication words or tokens in personal authorization statement text 232, may be revealed by laptop 200 if the authorization process modules validate the user's personal authentication statement. For example, if the computer objects-authentication words or tokens identify a single object (e.g., <application name>), laptop 200 may reveal the named application and present access to the application (e.g., application 250) on display 210 as shown in FIG. 4. If the computer objects-authentication words or tokens identify a set of applications (e.g., <code for retrieving a set of applications>), laptop 200 may reveal the set of applications and present access to the applications (e.g., applications 250, 252, and 254) on display 210 as shown in FIG. 5.

Laptop 200 may be configured to visually alert the user when the computer objects are in unconcealed states or when the concealed/unconcealed state of the computer objects changes. For example, button 212, which is represented by a closed lock icon 212 in FIGS. 2 and 3 corresponding to the situation when the computer objects are in concealed states, may change to show button 212' represented by an "open" lock to alert the user when the computer objects are in an unconcealed state (FIGS. 4 and 5).

FIG. 6 shows an example method 600 for revealing and granting an authorized user access to concealed computer objects in a computer system under a personal authorization statement-based authorization framework. Method 600 may make it more difficult for unauthorized users, impostors or defrauders to misuse stolen or mislaid computer systems with concealed computer objects thereon.

Method 600 may include receiving a string of characters as a personal authentication statement input at a computer-user interface by a user (610), and syntactically parsing a user-identity token and a computer objects-identity token from the personal authentication statement (620). Method 600 may further include authenticating the user contingent on the parsed user-identity token (630) and identifying at least one concealed computer object contingent on the parsed computer objects-identity token (640). Method 600 may also include, upon verifying that the authenticated user is authorized to access the identified at least one concealed computer object, revealing the identified at least one concealed computer object to the user (650).

In method 600, receiving a string of characters as a personal authentication statement input at a computer-user interface by a user 610 may include displaying an authentication dialog window for receiving the personal authentication statement input by the user. The authentication dialog window may be displayed in response to receiving instructions from the user to display the authentication dialog window. The instructions may be in the form of, for example, a button- or switch-activated, a touch-activated, a gesture-activated or a voice-activated signal from the user. Displaying the authentication dialog window configured to receive the personal authentication statement from the user may include displaying an input data field having a first portion for receiving the user-authentication token and a second portion for receiving the computer objects-identity token. The first and second portions may be in any order. The input data field may be displayed as a single contiguous or unbroken region with an invisible delimiter between the first portion for receiving the user-authentication token and the second portion for receiving the computer objects-authentication token.

Further in method 600, syntactically parsing the user-authentication token and the computer objects-authentication token from the personal authentication statement 620 may include lexical analysis of the personal authentication statement. Further syntactically parsing the user-authentication token and the computer objects-authentication token from the personal authentication statement 620 may include identifying a delimiter separating the user-authentication token and the computer objects-authentication token in the personal authentication statement input by the user. The delimiter may be identified as a special character or string of characters, or by special formatting (e.g., capital case fonts), in the text of the personal authentication statement input at the computer-user interface by the user.

In method 600, revealing the at least one concealed computer object upon authentication of the user may include displaying access to the least one concealed computer object on the computer-user interface. In case the computer objects-authentication token in the user's personal authorization statement references a set of concealed computer objects, method 600 may include identifying the set of concealed computer objects and revealing or displaying access to all of the set of concealed computer objects on the computer-user interface to the authenticated user.

The various techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer device, comprising:
   a computer-user interface configured to receive a string of characters as a personal authentication statement input by a user, the string of characters including a concatenation of a user-authentication token and a computer objects-authentication token; and
   a parser configured to parse and extract the user-authentication token and the computer objects-authentication token from the personal authentication statement input by the user,
   wherein the computer objects-authentication token identifies at least one concealed computer object, and
   wherein the computer device is configured to reveal at least one concealed computer object upon authentication of the user based on the extracted user-authentication token and verification that the authenticated user is authorized to access the at least one concealed computer object based on the extracted computer objects-authentication token.

2. The computer device of claim 1, further comprising a user-authenticator configured to authenticate the user contingent on the parsed user-authentication token.

3. The computer device of claim 1, further comprising an object-authenticator configured to identify at least one concealed computer object contingent on the parsed computer objects-identifying token.

4. The computer device of claim 1, wherein the computer-user interface is configured to display an authentication dialog window to receive the personal authentication statement input by the user.

5. The computer device of claim 4, wherein the computer-user interface is configured to display the authentication dialog window to receive the personal authentication statement input by the user in response to a signal from the user to display the authentication dialog window, and wherein the signal is one of a button- or switch-activated, a touch-activated, a gesture-activated and a voice-activated signal from the user.

6. The computer device of claim 4, wherein the computer-user interface is configured to display the authentication dialog window having an input data field configured to receive the string of characters including the concatenation of a user-authentication token and the computer objects-authentication token with a first portion of the input data field for receiving the user-authentication token and a second portion of the input data field for receiving the computer objects-authentication token, and to display the input data field as a contiguous region with an invisible delimiter between the first portion for receiving the user-authentication token and the second portion for receiving the computer objects-authentication token, respectively.

7. The computer device of claim 1, wherein the parser is configured to identify a delimiter separating the user-authentication token and the computer objects-authentication token in the personal authentication statement input by the user.

8. The computer device of claim 1, wherein the computer device is configured to reveal at least one concealed computer object by displaying access to the least one concealed computer object on the computer-user interface to the authenticated user.

9. A method, comprising:
in a microprocessor-based computer device,
receiving a string of characters as a personal authentication statement input at a computer-user interface by a user, the string of characters including a concatenation of a user-authentication token and a computer objects-authentication token;
parsing and extracting the user-authentication token and the computer objects-authentication token from the personal authentication statement;
authenticating the user contingent on the parsed user-authentication token;
identifying at least one concealed computer object contingent on the parsed computer objects-authentication token; and
upon verifying that the authenticated user is authorized to access the identified at least one concealed computer object,
revealing the identified at least one concealed computer object to the user.

10. The method of claim 9, wherein receiving a string of characters as a personal authentication statement input at a computer-user interface by a user includes displaying an authentication dialog window configured to receive the personal authentication statement input by the user.

11. The method of claim 10, wherein displaying the authentication dialog window configured to receive the personal authentication statement input by the user includes displaying the authentication dialog window in response to receiving instructions from the user to display the authentication dialog window.

12. The method of claim 11, wherein receiving instructions from the user to display the authentication dialog window includes receiving one of a button- or switch-activated, a touch-activated, a gesture-activated or a voice-activated signal from the user.

13. The method of claim 10, wherein displaying the authentication dialog window configured to receive the personal authentication statement from the user includes:
displaying an input data field having a first portion for receiving the user-authentication token and a second portion for receiving the computer objects-authentication token; and
displaying the input data field as a contiguous region with an invisible delimiter between the first portion for receiving the user user-authentication token and the second portion for receiving the computer objects-authentication token, respectively.

14. The method of claim 9, wherein parsing the user-authentication token and the computer objects-authentication token from the personal authentication statement includes lexical analysis the personal authentication statement.

15. The method of claim 9, wherein parsing the user-authentication token and the computer objects-authentication token from the personal authentication statement includes identifying a delimiter separating the user-authentication token and the computer objects-authentication token in the personal authentication statement input by the user.

16. The method of claim 9, wherein revealing the at least one concealed computer object upon authentication of the user includes displaying access to the least one concealed computer object on the computer-user interface to the authenticated user.

17. The method of claim 9, wherein identifying at least one concealed computer object contingent on the parsed computer objects-authentication token includes identifying a set of concealed computer objects contingent on the parsed computer objects-authentication token, and wherein revealing the at least one concealed computer object upon authentication of the user includes displaying access to the set of concealed computer objects on the computer-user interface to the authenticated user.

18. A non-transitory computer readable medium, comprising:
instructions capable of being executed on a microprocessor,
which instructions when executed allow a computer device to process a string of characters as a personal authentication statement input by a user at a computer-user interface;
parse and extract the user-authentication token and the computer objects-authentication token from the personal authentication statement input by the user; and
reveal at least one concealed computer object upon authentication of the user based on the extracted user-authentication token and verification that the authenticated user is authorized to access the identified at least one concealed computer object based on the extracted computer objects-authentication token.

19. The non-transitory computer readable medium of claim 18, wherein the instructions when executed on the microprocessor cause the computer-user interface to:
display an authentication dialog window to receive the personal authentication statement input by the user, wherein the authentication dialog window has an input data field having a first portion for receiving the user authentication token and a second portion for receiving the computer objects-authentication token; and
wherein the input data field is displayed as a contiguous region with an invisible delimiter between the first portion for receiving the user-authentication token and the second portion for receiving the computer objects-authentication token, respectively.

20. The non-transitory computer readable medium of claim 18, wherein the instructions when executed on the microprocessor cause the computer-user interface to:
reveal the at least one concealed computer object upon authentication of the user by displaying access to the least one concealed computer object on the computer-user interface to the authenticated user.

* * * * *